United States Patent [19]

Mitchell

[11] Patent Number: 5,139,604

[45] Date of Patent: Aug. 18, 1992

[54] CONTROLLED BLADDER WRAP TOOL SYSTEM

[76] Inventor: Charles P. Mitchell, 28042 Essex, Roseville, Mich. 48066

[21] Appl. No.: 520,731

[22] Filed: May 9, 1990

[51] Int. Cl.⁵ .................. B32B 31/20; B30B 05/02
[52] U.S. Cl. ...................... 156/479; 100/211; 156/216; 156/475; 156/580; 156/382
[58] Field of Search .............. 156/216, 583.3, 479, 156/580, 493, 382, 475; 425/389; 100/211

[56] References Cited

U.S. PATENT DOCUMENTS

| | | | |
|---|---|---|---|
| 3,753,831 | 8/1973 | Copithorne | 156/493 X |
| 3,871,941 | 3/1975 | Wasko | 156/382 |
| 4,705,589 | 11/1987 | Enders | 425/389 X |
| 4,830,693 | 5/1989 | Okafuji et al. | 156/401 X |

Primary Examiner—Caleb Weston
Assistant Examiner—Adrienne C. Johnstone

[57] ABSTRACT

A controlled bladder wrap tool system and method are disclosed for edge wrapping a substrate in a tool with consistent process control. An expandable bladder or bladder diaphragm is mounted in the tool adjacent a cavity where it expands when inflated to fill the cavity and to bend, fold or wrap an overhanging portion of pliable material onto a substrate which are mounted in the tool.

13 Claims, 4 Drawing Sheets

CONTROLLED BLADDER WRAP TOOL SYSTEM

This invention relates to a contained and controlled bladder wrap tool system and more particularly to a tool system and to a method to edge wrap substrates automatically with consistent process control.

The invention is designed to be used with a full range of substrate panels and wrap vinyl, leather, cloth and any other pliable material in order to form, as an example, headliners, instrument panels, booster panels, door panels, seat backs, console panels, header panels and other edge wrap substrates for use in the automobile industry.

Such headliners, instrument panels and other panels of the type described are now manufactured using mechanical devices and manual method steps for edge wrapping and gluing the overhanging portion of the vinyl wrap or leather cloth to the substrate. This requires considerable labor costs, cycle times and also possible injuries to the person who must utilize his or her hands in manipulating and bending the edge of the pliable material over the substrate repeatedly, day in and day out. This could cause injury to the person's hand resulting in compensation claims against the employer.

It is therefore a feature of the present invention to use a contained and controlled bladder system to edge wrap pliable material over the substrate to form the required panel.

A further feature of the present invention is to provide a contained and controlled bladder system which is less costly than manual systems and mechanical systems now employed to make the required panels.

It is still a further feature of the present invention to provide a controlled bladder wrap tool system which is designed to conform to almost any shape of panel to be produced and further which does not require a dedicated machine.

DETAILED DESCRIPTION OF AN EMBODIMENT OF THE INVENTION

Figure 1:
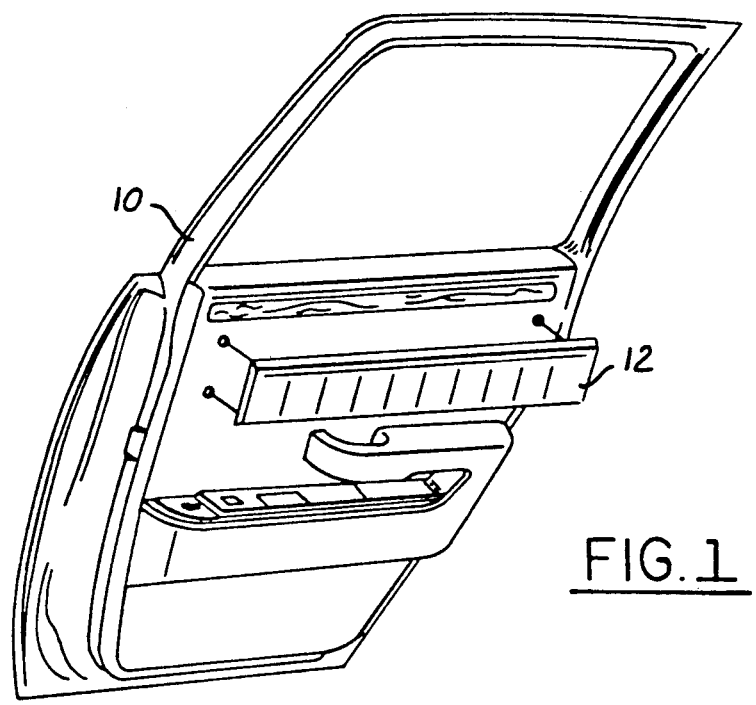
FIG. 1 is a perspective view of a door for an automobile and showing a door panel made according to the present invention.
Figure 2:
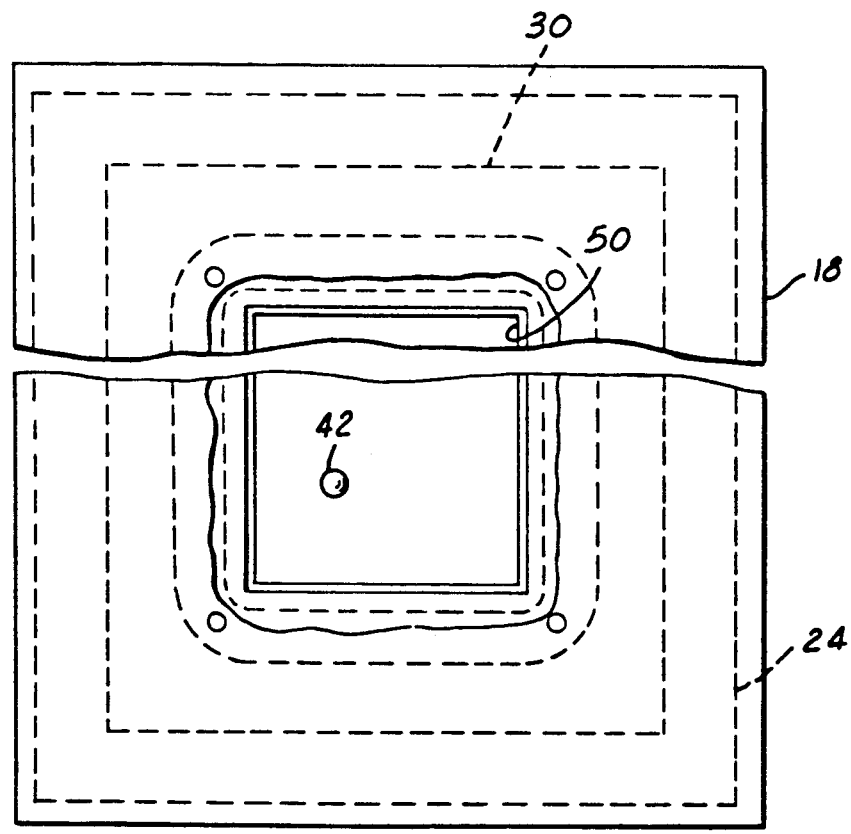
FIG. 2 is a fragmentary plain view of the bladder wrap tool system, with parts broken away in order to expose the interior.

Referring now to the drawings, FIG. 1 shows an automobile door 10 having a door panel 12 of the type which can be manufactured according to the method and apparatus of the present invention.

Figure 3:
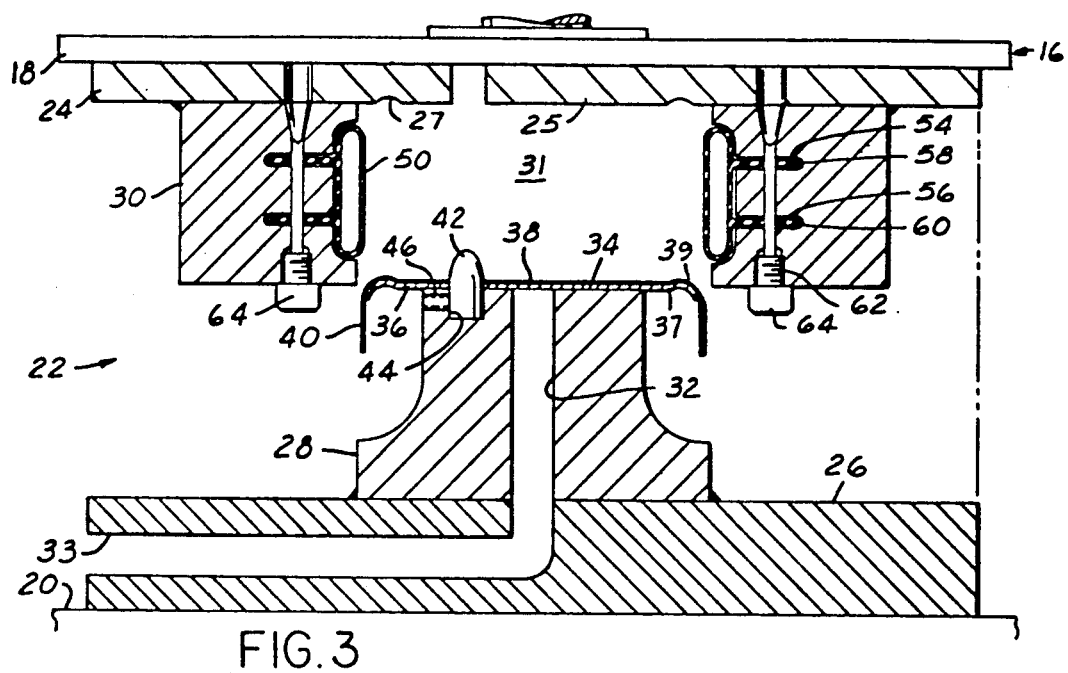
FIG. 3 is a vertical sectional view through a press, or other machine tool, fragmentarily shown, in which the bladder wrap tool system is located between the upper and lower platens of the machine or press, and with the bladder wrap tool system shown in an open position.

Specifically, the present invention relates to a controlled and contained bladder wrap tool system which may be used with a non-dedicated machine or press 16, fragmentarily shown in FIG. 3, and containing the movable platen 18 and a stationary platen 20.

The controlled bladder wrap tool system 22 is designed to edge wrap substrates automatically with a pliable material and to do so with consistent process control. The bladder tool system 22 includes an upper tool base 24 and a lower tool base 26. It further includes an inner tool part 28 and a outer tool part 30 which cooperate, when in a closed position, to form a cavity 31.

The inner tool part 28 is welded or otherwise secured to the lower tool base 26. A passage for vacuum is provided in the base 26 and intersects a passage 32 provided in the inner tool part 28. A support surface 34 is provided at the top of the inner tool part 28 for providing a support surface for the general rigid substrate 36 and for the overlying pliable material 38 which has an overhanging edge portion 40.

The top support surface 34 is provided with a locator pin 42 which is received in a recess 44 provided in the inner tool support 28. The locator pin 42 is locked in place by means of a threaded set screw or pin 46. The substrate 36 and the pliable material 38 are provided with locating openings in order to receive the locator pin 42 as illustrated in FIG. 3. This locates the substrate 36 and pliable material in the required positions.

Figure 4:
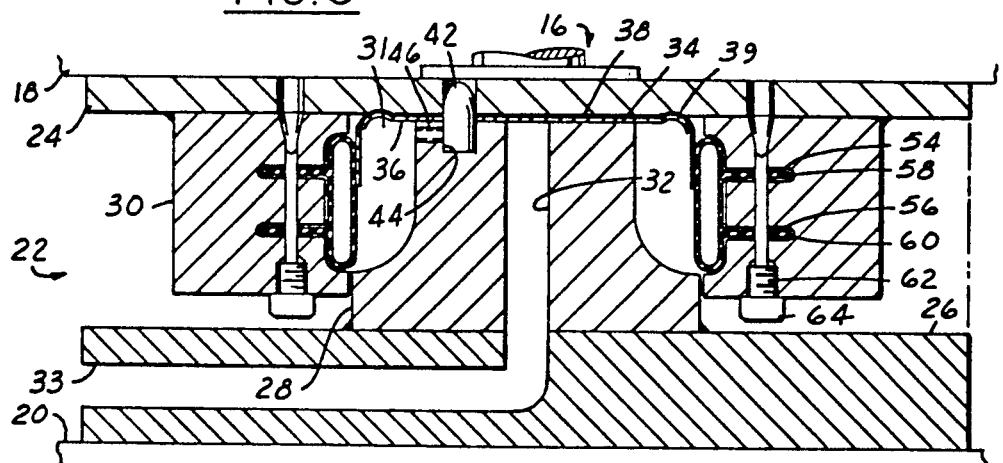
FIG. 4 is an elevational view, partly in section, with the bladder wrap tool system in a closed position prior to the expansion of the bladder or bladder diaphragm.

The outer tool part 30 is welded or otherwise secured to the upper tool base 24. The outer tool part 30 is designed to carry the bladder or bladder diaphragm 50 and is shaped to receive the inner tool support 28 as illustrated in FIG. 4 and thereby form the cavity 31.

The outer tool part 30 is provided with a pair of slots 54 and 56 which receive flanges 58 and 60 respectively which are integral with the bladder 50. The outer tool part 30 is also provided with four threaded openings 62 located around the periphery of the outer tool part 30. Corresponding openings are provided in the flanges 58, 60 of the bladder 50 in order to receive the threaded locating elements 64. The locating elements 64 are screw threaded into the inner tool part 30 and extend through the flanges 58, 60 of the bladder 50 to retain the bladder 50 in position with respect to the inner tool part 30.

The bladder or diaphragm 50 is designed to expand to four to six times its size. The bladder 50 is made form silicone rubber and can withstand temperatures up to 350 degrees F. The bladder 50, as an example, has a wall thickness of 0.062 inches plus or minus 0.005 inch. It has a height as viewed in FIG. 3 of two inches and is thus referred to as a two inch bladder with an expansion ratio of four or six to one. The legs or flanges 58, 60 provided on the bladder 50 are approximately 1.12 inches in length.

Figure 8:
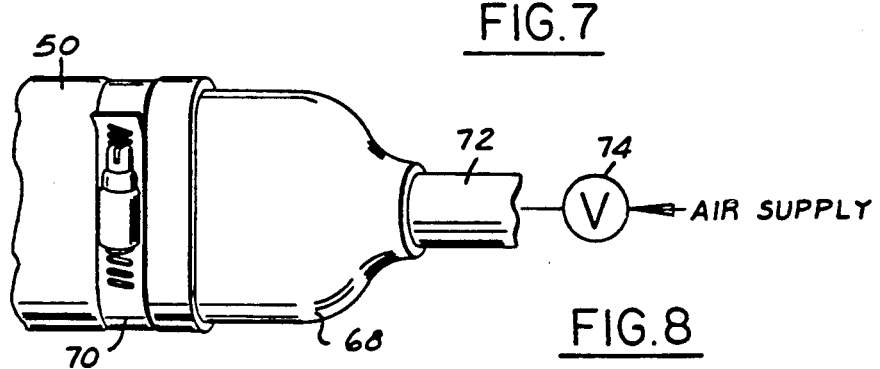
FIG. 8 is a fragmentary view illustrating an air supply source and valve for the bladder or bladder diaphragm of the bladder wrap tool system.

The bladder 50 is connected to an air supply system as shown in FIG. 8. Bladder 50 is connected to a nozzle 68 by a fastener band 70. The nozzle 68 is connected by tubing 72 and a valve 74 to the air supply system, not shown.

Figure 5:
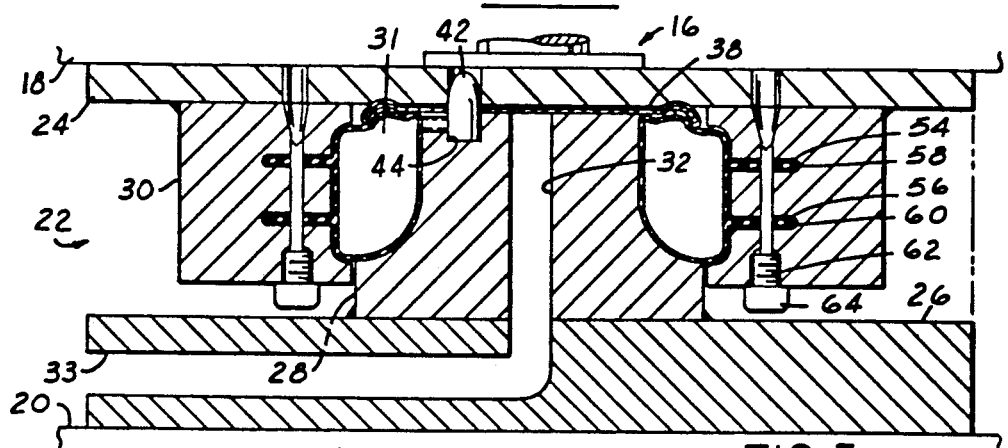
FIG. 5 is a view similar to FIG. 4 but showing the bladder or bladder diaphragm in an expanded position in order to force the overhanging portion of the pliable material against or over the edge of the substrate.
Figure 6:
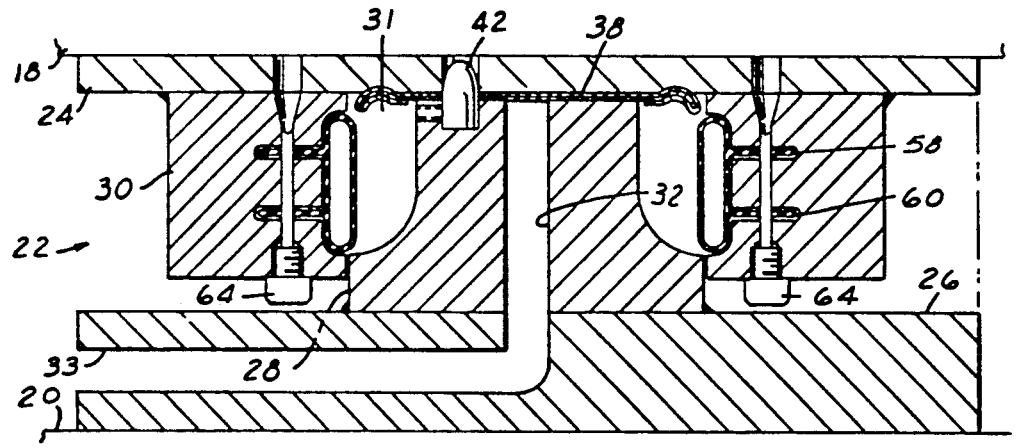
FIG. 6 is a view similar to FIGS. 4 and 5, with the bladder or bladder diaphragm deactivated and with the edge of the pliable material bent over and secured to the substrate.
Figure 7:
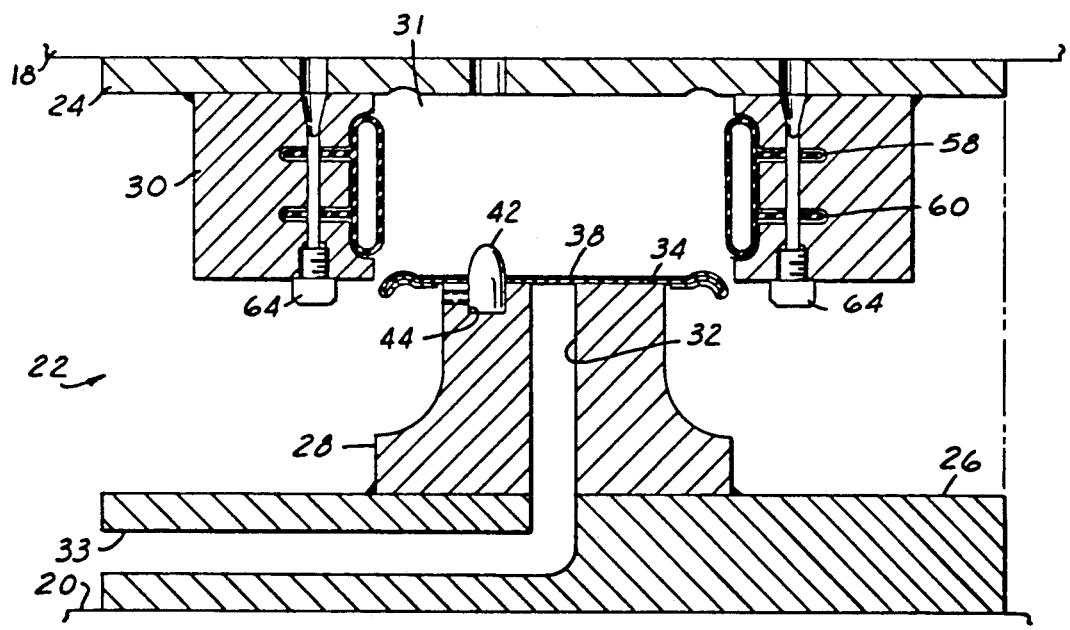
FIG. 7 is a view similar to FIG. 3 but showing the door panel in a completed stage ready to be removed from the inner tool part.

The bladder 50 is located adjacent to or in the cavity 31 formed by the inner and outer tool parts 28 and 30 when in a closed position as shown in FIGS. 4, 5 and 6. The air from the air supply source expands the bladder 50 which will take the shape or the contour of the cavity 31. The cavity 31 can vary in size and shape in order to make the required panel.

In FIGS. 3 and 4, the substrate 36 has an overhanging portion 37 extending into cavity 31. Portion 37 is provided with a hump or curved edge 39 around which the overhanging portion 40 of the pliable material is wrapped. The upper tool base 24 has a surface 25 parallel to and spaced from the support surface 34. Grooves or indentations 27 are provided in surface 25 for receiving the hump or curved edge 39 of the substrate 36 when the tool parts are closed as shown in FIGS. 4 and 5.

Prior to placing the pliable material on the substrate carried by the support surface, adhesive is applied to the overhanging portion 40 of the pliable material so that it will stick or be secured to the substrate edge portion 37 when moved into contact therewith by the expanding bladder 50 as shown in FIG. 5. The bladder or diaphragm 50 expands and completely fills the cavity 31. The bladder 50 is contained by the inner and outer tool parts and take the shape or contour of the cavity 31. Thus, each different part to be manufactured will have inner and outer tool parts of different configurations. The bladder 50, when expanded, engages the overhanging portion of the pliable material, and bends and forces it into adhesive engagement with the underside of the substrate portion 37 as shown in FIG. 5.

With respect to the described controlled bladder wrap tool system, Applicant discloses a method of pneumatically edge wrapping a portion 40 of a sheet of pliable material 38 over a portion 37 of the substrate 36. Such method is practiced by using a tool system having an inner tool part 28 of a predetermined configuration and an outer tool part 30 of a predetermined configuration which is generally hollow and is adapted to receive the inner tool part 28 so that they may cooperate to define a cavity 31 in which is located the expandable bladder diaphragm 50.

The method steps include mounting a substrate 36 on the support surface 34 of the inner tool part 28. The substrate is mounted so that a portion 37 of the substrate 36 overhangs the support surface 34.

A further method step includes mounting a sheet of pliable material on the support surface 34 overlying the substrate 36, with a portion 40 of the sheet of pliable material extending into the cavity 31 beyond the overhanging portion 37 of the substrate 36.

After the inner and outer tool parts are moved to a closed position by the press 16, the bladder or bladder diaphragm 50 is pneumatically inflated within the cavity 31 and portion of the bladder diaphragm 50 is urged against the portion 40 of the pliable material 38 in order to wrap or bend it over the overhanging edge portion 37 of the substrate 36. After the substrate 36 is edge wrapped as just described, the press is opened, the inner and outer tool parts are separated and the product is removed from the tool parts.

Another method step includes the step of placing an adhesive on the portion of the pliable material before mounting the sheet of pliable material on the support surface 34.

The method of pneumatically edge wrapping a substrate further includes the step of applying a vacuum to the tool system prior to inflating the bladder diaphragm.

The method of pneumatically edge wrapping a substrate may also include the step of positively locating the substrate 36 and the sheet of pliable material 38 on the support surface 34 prior to the inflation of the bladder diaphragm 50. The invention also contemplates the step of securing the inner and outer tool parts to the upper and lower tool bases respectively so that the control bladder wrap tool system may be used in a non-dedicated machine tool or press.

The function of the bladder wrap tool system is to edge wrap substrates automatically with consistent process control. It can be used with a full range of substrate panels and vinyl wrap, leather, cloth and other pliable material. It will generally wrap 90 percent to 100 percent of any given substrate. As indicated previously, each tool system needs to be designed for the given substrate.

The basic components of the edge wrap tool system can be made from any common tooling material such as steel, aluminum, plastic or wood. The choice of tool materials is based upon design and function of the tool, i.e. prototype or production, cycle life expectancy and process procedures.

It should also be understood that the controlled bladder wrap tool system of the present invention may be utilized by loading the tool system with a substrate having a pre-applied wrap material or by loading the tool with a substrate and with a wrap material as described herein. In either instance, the tool system is closed and vacuum is applied to the bladder containment tool. Thereafter, air is directed to the bladder or bladder diaphragm 50 in order to expand the bladder, which will assume the shape of the cavity 31, and force the overhanging portion of the wrap material against the substrate. As indicated, the bladder 50 inflates and conforms to the containment contour of the cavity 31. As the bladder 50 expands and assumes the contour of the cavity 31, the wrap material will wrap or bend around the substrate and is secured thereto by the adhesive.

Figure 9:
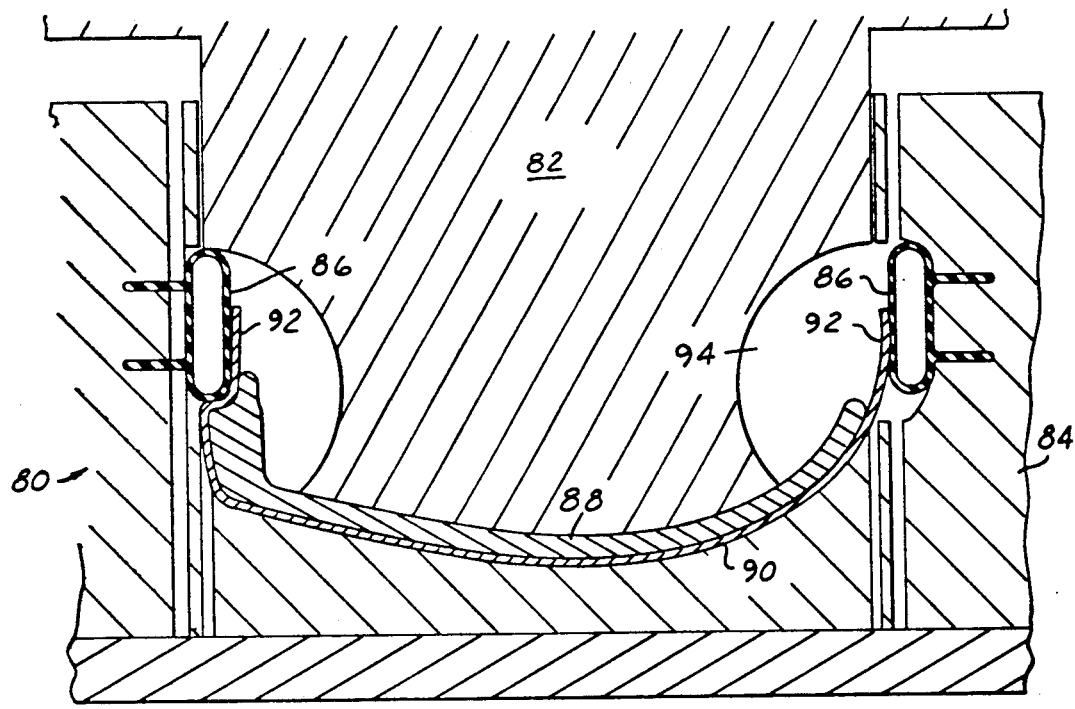
FIG. 9 shows a different contoured bladder wrap tool system for making another type of panel, with the bladder or bladder diaphragm shown in a non-expanded position.
Figure 10:
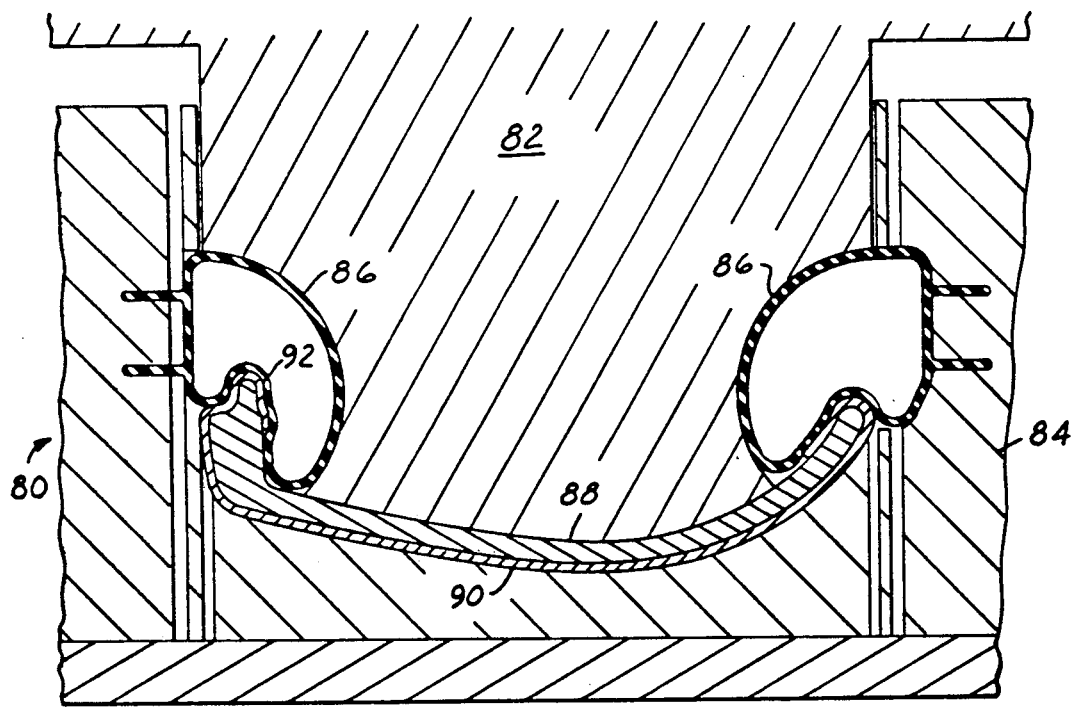
FIG. 10 is a view of the modified contoured bladder wrap tool system of FIG. 9 showing the bladder or bladder diaphragm in an expanded position in order to bend over the edges of the pliable material on the substrate of the panel.

FIGS. 9 and 10 illustrates a modified control bladder wrap tool system 80 having an inner tool part 82 and an outer tool part 84 to which is appropriately connected the expandable or inflatable bladder or bladder diaphragm 86. When the inner and outer tool parts 82 and 84 are separated, a substrate 88 having, on one side thereof, pliable material 90 with an overhanging edge portion 92 is placed in the apparatus 80 as shown in FIG. 9. The overhanging edge portion 92 engaged the bladder 86. A cavity 94 is located between the inner tool part 82 and the outer tool part 90 when the inner and outer tool parts are closed as shown in FIG. 9. Prior to closing the tool, adhesive is applied to the overhanging edge portion 92 of the pliable material 90. Thereafter, after the closing of the tool parts by the press, the bladder or expandable diaphragm 86 is inflated four or five times its size so as to completely assume the contour configuration of the cavity 94 and to force, bend and thereafter secure the overhanging edge portion 92 of the pliable material 90 to the edge portion of the substrate 88 as illustrated in FIG. 10. The air pressure is maintained for a period of time depending on the curing rate of the adhesive in order to secure the pliable material to the substrate 88.

It should be appreciated that the controlled bladder wrapped tool system may contain any number of bladders or bladder diaphragms in one tool. As an example, eight to ten bladders could be used in one tool and thereafter the bladders would be inflated in sequence to perform the desired bending and folding functions.

The controlled bladder wrapped tool system may be used with a standard press. Thus requirement for a dedicated press have been eliminated by the present invention.

Preferred embodiments of the present invention have been disclosed; however, a worker of ordinary skill in the art would realize that certain modifications including the use of a plurality of bladders would be considered within the scope of this invention, and thus the following claims should be referred to to determine the scope and content of the present invention.

What I claim is:

1. A controlled bladder wrap tool system for wrapping a portion of pliable material over an edge of a substrate comprising:
   upper and lower tool bases;
   inner and outer tool parts;
   means securing said inner tool part to one of said tool bases and said outer tool part to the other of said tool bases;
   means providing for relative movement between said tool bases to locate said tool parts spaced apart and in an opened position ready to receive the substrate and pliable material or in a closed position where said inner tool part is located within said outer tool part and where a portion of the pliable material is ready for wrapping over an edge of the substrate;
   one of said inner and outer tool parts having a support surface for supporting the substrate and the pliable material which has an overhanging portion which overlies and extends beyond an edge of the substrate; and
   a fluid expandable bladder diaphragm secured to one of said inner and outer tool parts, and, when expanded, cooperable with the other of said tool parts when said tool parts are in a closed position to engage the overhanging portion of the pliable material to wrap it over the edge of the substrate.

2. The controlled bladder wrap tool system as recited in claim 1, wherein said inner tool part is secured to said lower tool base and said outer tool part is secured to said upper tool base.

3. The controlled bladder wrap tool system as recited in claim 2, wherein said support surface is provided on said inner tool part.

4. The controlled bladder wrap tool system as recited in claim 3, wherein said bladder diaphragm is secured to said outer tool part.

5. The controlled bladder wrap tool system as recited in claim 4, wherein said bladder diaphragm and said outer tool part include engaging portions through which a series of retaining elements extend to hold and secure the expandable bladder diaphragm to the outer tool part.

6. The controlled bladder wrap tool system as recited in claim 5, wherein said retaining elements are threaded into said outer tool part.

7. The controlled bladder wrap tool system as recited in claim 1, wherein said bladder diaphragm has a pair of flanges which are received in retaining slots located in said one of said inner and outer tool parts; and a series of threaded retaining elements carried by said last mentioned one tool part and extending through said flanges and slots to hold the bladder diaphragm in place.

8. The controlled bladder wrap tool system as recited in claim 1, wherein said inner and outer tool parts are spaced apart to define a cavity in which the overhanging portion of the pliable material extends and through which the bladder diaphragm moves when expanded.

9. The controlled bladder wrap tool system as recited in claim 3, wherein a locating pin is carried by the support surface of said inner tool part and is extendable through openings provided in the substrate and in the pliable material, said locating pin being engageable in an opening provided in the upper tool base when said tool parts are in a closed position.

10. The controlled bladder wrap tool system recited in claim 3, wherein said inner tool part and said lower tool base are provided with a passage for directing vacuum to the substrate and pliable material to retain same on the support surface.

11. The controlled bladder wrap tool system recited in claim 10, wherein said fluid expandable bladder diaphragm is connected to a source of air via a passage which extends from said source through the inner or outer tool part to which said bladder diaphragm is connected.

12. The controlled bladder wrap tool system as recited in claim 3, wherein said upper tool base is provided with a support cavity and surface located opposite the support surface provided on the inner tool part for supporting the substrate and pliable material when the tool parts are in a closed position.

13. The controlled bladder wrap tool system as recited in claim 1, wherein said bladder diaphragm is made from silicone rubber.

* * * * *